No. 854,317. PATENTED MAY 21, 1907.
W. TYREE.
AUTOMATIC SPRAY FOR PAINTING, AGRICULTURAL, DISINFECTING,
AND OTHER ANALOGOUS PURPOSES.
APPLICATION FILED NOV. 14, 1906.
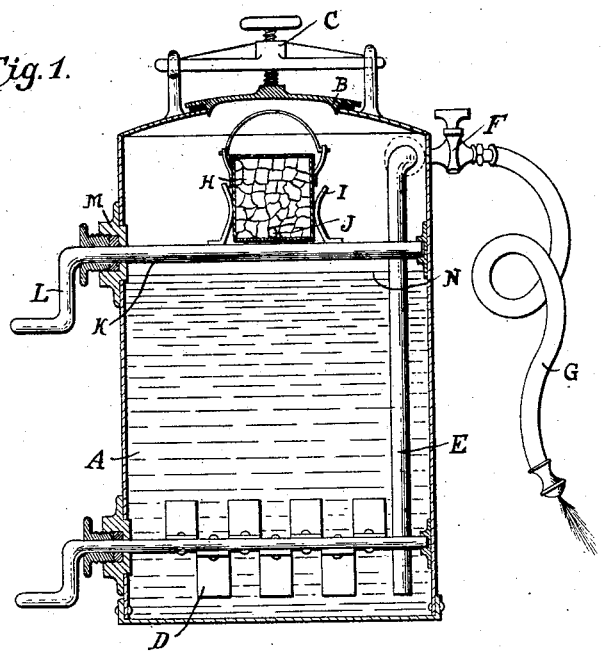
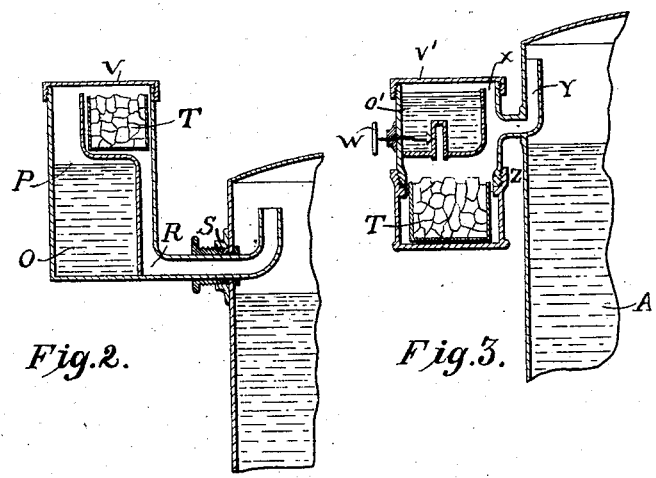

UNITED STATES PATENT OFFICE.

WILLIAM TYREE, OF NELSON, NEW ZEALAND.

AUTOMATIC SPRAY FOR PAINTING, AGRICULTURAL, DISINFECTING, AND OTHER ANALOGOUS PURPOSES.

No. 854,317.        Specification of Letters Patent.        Patented May 21, 1907.

Application filed November 14, 1906. Serial No. 343,440.

*To all whom it may concern:*

Be it known that I, WILLIAM TYREE, a British subject, and a citizen of New Zealand, Australasia, residing in and having an industrial or commercial establishment in Trafalgar street, Nelson, New Zealand, aforesaid, have invented new and useful Improvements in an Automatic Spray for Painting, Agricultural, Disinfecting, and other Analogous Purposes, of which the following is a specification.

My invention consists principally in the application of acetylene gas as a motive power in an apparatus, also the subject of my invention, worked automatically by the operation of such gas, for the spraying of paint, and fluids or solutions for agricultural, disinfecting, and other analogous purposes.

My invention is carried out by the construction of a metal cylinder, having an aperture at the top fitted with a gas tight lid. For large sizes of the apparatus, when the use of oil or other liquids which will not dissolve carbid of calcium is not required, a shaft is placed across the upper part of the inside of the cylinder, onto which a receptacle is fastened to hold carbid of calcium, the end of the shaft passing through a stuffing box. The receptacle is so arranged, that when the shaft is revolved, it is turned upside down, and the carbid of calcium is thrown into the solution for spraying placed in the cylinder.

For smaller sizes of the apparatus a fixed shaft without a stuffing box will suffice, the apparatus being turned on its side when required for use so as to allow the water to reach the carbid.

A pipe is provided having its lower end near the bottom of the cylinder and its upper end projecting through the top thereof. A tap is fixed into the external end of the pipe, and a tube or length of hose of convenient length is affixed thereto, in such way that the same can be moved by the hand in different directions. Any spraying nozzle can be attached to the end of tube or length of hose.

When the use of oil or other liquid, which will not dissolve carbid of calcium is required, a separate carbid and water chamber is attached to the outside of the cylinder, having a pipe connected with the cylinder, the gas passing into the cylinder as soon as such separate chamber is operated so as to cause the generation of the gas.

The apparatus as hereinbefore described may have the addition thereto of such separate carbid and water chamber, so that the apparatus may be used in either way; or the apparatus may be constructed with the outer carbid and water chamber only, and without the inner receptacle for carbid and the shaft to which the same is attached.

Provision is made to prevent settlement when required in the liquid or solution contained in the cylinder, by an agitator consisting of a sheet or flap of metal having a rod attached thereto passing through a stuffing box in the cylinder, operated by means of a bent handle. The apparatus may be constructed without such agitator, if not required for the liquid or solution to be used.

The cylinder being filled with the paint, liquid or solution required and acetylene gas being generated from the carbid the same forces the solution through the tube or tubes in the cylinder, the outer tubes attached thereto, and the nozzles, in the form of a spray, which will continue until nearly all the liquid or solution is exhausted, or until it is stopped by turning the tap or taps in the tube or tubes.

My invention is more particularly described in connection with and is illustrated in the accompanying drawings in which the same letters indicate the like parts.

The figures in the said drawings show sectional elevations of apparatus the subject of my invention.

In Figure 1 "A" is a metal cylinder which is filled to the level shown at "N" with the liquid or solution required. "B" is a gas tight door secured by the clamp "C" or by other suitable means. "E" shows a pipe carried through the top and taken through the cylinder terminating a short distance above the bottom through which the liquid or solution will be forced by the acetylene gas generated. Another pipe on the opposite side of the cylinder may be fixed therein so that the spraying tubes with nozzles attached to each outlet may be operated with both hands. Or a number of such pipes and attachments may be fixed into a cylinder of large size. A passage or passages may be constructed against the inside of the cylinder to serve as an outlet or outlets instead of a pipe or pipes. "F" is a stop valve or tap attached to the pipe "E." "G" is a tube or length of hose attached thereto having a spray device or nozzle fixed thereon. "H" is a removable receptacle to hold carbid of calcium having a gas vent at "J." "I" represents any suitable clip constructed to hold the same. "K" is a rotary or semi-rotary shaft to permit of the receptacle "H" being submerged in the liquid or solution, operated by the handle "L" through the packing gland "M."

Figs. 2 and 3 show different forms of a separate carbid or water chamber for the generation of acetylene gas attached to the outside of the cylinder "A," having a pipe connected with the cylinder, the same being either as an addition to the apparatus as shown in Fig. 1, so that acetylene gas may be generated in the cylinder "A" or in the outside chamber, or the inner receptacle "H" and shaft "K" to which the same is attached in the cylinder may be omitted therefrom. The latter would be the case if the cylinder "A" were used wholly for paint or oil.

In Fig. 2 "O" shows the separate carbid and water chamber which is filled with water to the level shown at "P." "T" is a removable receptacle to hold the carbid of calcium having a screwed gas tight cover "V." "R" is a hollow trunnion working in a gland or stuffing box "S," by which the chamber "O" may be reversed so that the water may reach the carbid.

In Fig. 3 "O'" is the separate carbid and water chamber with screwed gas tight cover "V¹." "T¹" shows the lower portion of the chamber constructed to hold the carbid of calcium. "W" is a valve operated so as to admit water with which the upper portion of the chamber is filled to fall on to the carbid in the lower portion. "X" is a gas outlet into the upper portion of the chamber. "Y" a gas outlet into the cylinder "A." A safety valve can be placed in the top of the apparatus if considered desirable.

I do not limit myself to the precise details hereinbefore stated for the construction or arrangement of apparatus for the generation of acetylene gas in a cylinder having outlets through which paint or a liquid or solution for the purposes stated may be forced by the action of the gas and converted into spray by attachments thereto, nor to the construction or arrangement of a separate carbid or water chamber outside of and connected with a cylinder having such outlets as before mentioned of which the contents may be so operated upon by the action of the gas admitted into the cylinder. The apparatus described may be modified and arranged in different ways so as to produce the action required without departing from my invention, but for the sake of illustration I have shown in the drawings different forms which the apparatus may take.

For agricultural purposes the cylinder would be filled with any solution used for the destruction of parasites or noxious insects causing disease or injury. For disinfecting purposes with a solution containing the particular disinfectant required.

The apparatus can be constructed in any size. It can be of a size small enough to take the shape of a toilet requisite; or light in weight for use by nurses in sick rooms or hospital wards; or for out of door work of a size to be carried on a man's back the spraying tube or tubes being moved and directed by the hand or hands as required for spraying; or the apparatus may be of such a size as to render a cart necessary for carrying the same, in which case the spraying tube or a number of spraying tubes would be directed by a man or men in the cart.

The apparatus is cheap in construction and would be available as an article of household use for the frequent whitewashing of walls and outhouses so covered. The walls of buildings and other structures can also be easily painted with water or oil paint by means of the apparatus and by any person who may use the same.

The apparatus could also be used for the treatment of beds of sewage with solutions.

The application of the apparatus to any purpose analogous to any of the purposes hereinbefore mentioned such as the washing of houses, windows, horses, or other cleansing purposes.

Having now fully described and ascertained my said invention and the manner in which it is to be performed I declare that what I claim is.—

1. An automatic spraying device comprising a receptacle, spraying means connected thereto, a carbid receptacle in connection with said receptacle and means for introducing fluid into said carbid receptacle for generating gas.

2. An automatic spraying device comprising a receptacle, spraying means connected therewith, a carbid receptacle in connection with said receptacle and means for introducing fluid to said carbid receptacle, said means including means for inverting the carbid receptacle.

3. An automatic spraying device comprising a receptacle, spraying means connected therewith, a rotary shaft passing through the receptacle and a carbid receptacle carried by said shaft and adapted to be immersed in the liquid in the receptacle when the shaft is rotated.

Dated the thirteenth day of October, 1906.

WILLIAM TYREE.

Witnesses:
ALFRED DE PISSA,
ARTHUR G. GOODIN.